Aug. 26, 1941.　　　　　C. S. THIDE　　　　　2,254,052
CHANGE-OVER AND SHUTTER CONTROL FOR MOVING PICTURE PROJECTORS
Filed March 1, 1939　　　2 Sheets-Sheet 1
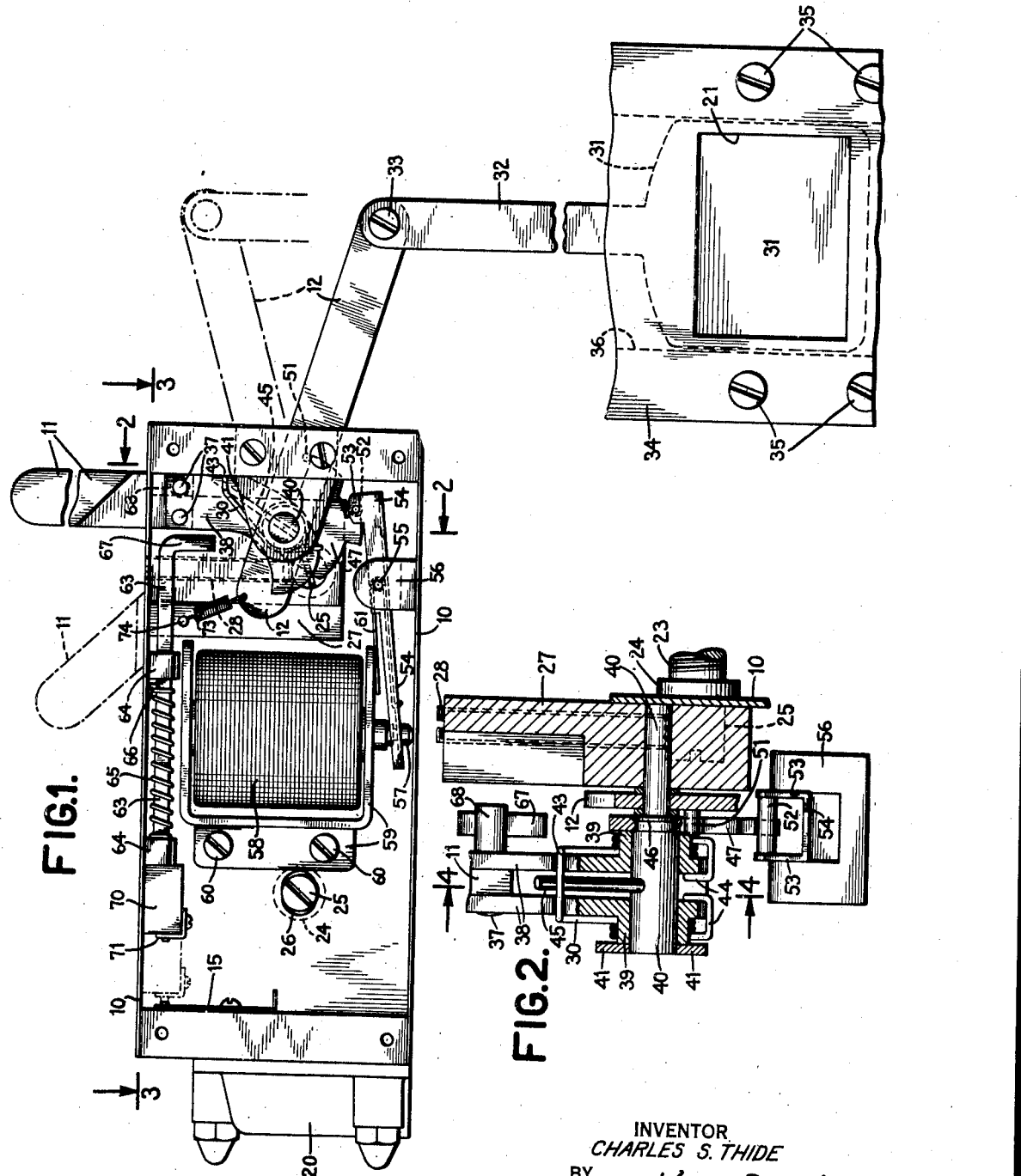
INVENTOR
*CHARLES S. THIDE*
BY
ATTORNEYS Aug. 26, 1941.  C. S. THIDE  2,254,052
CHANGE-OVER AND SHUTTER CONTROL FOR MOVING PICTURE PROJECTORS
Filed March 1, 1939  2 Sheets-Sheet 2
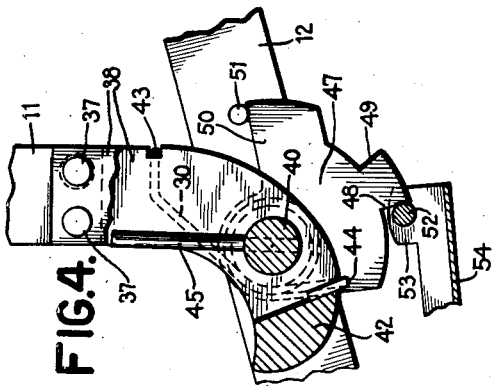
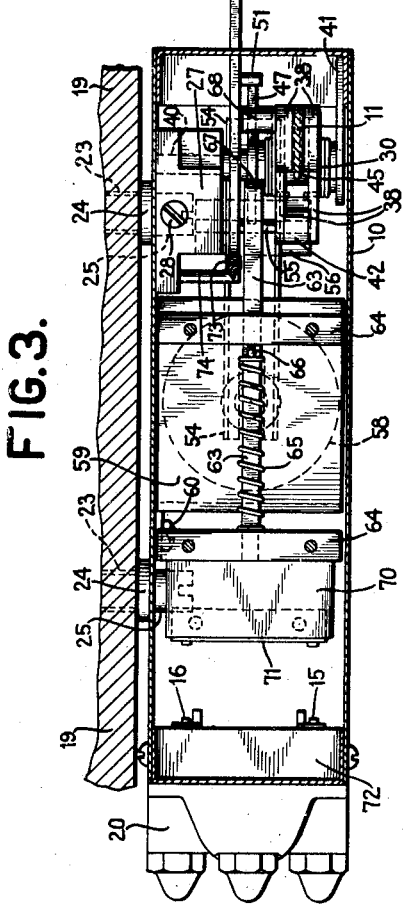
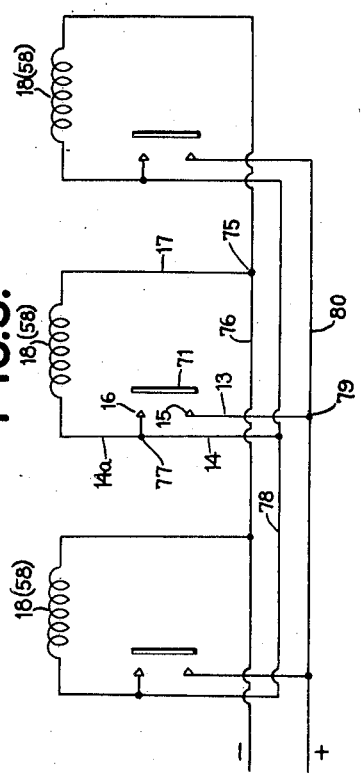
INVENTOR
CHARLES S. THIDE
BY
ATTORNEYS Patented Aug. 26, 1941

2,254,052

UNITED STATES PATENT OFFICE 2,254,052

CHANGE-OVER AND SHUTTER CONTROL FOR MOVING PICTURE PROJECTORS

Charles S. Thide, East Northport, N. Y.

Application March 1, 1939, Serial No. 259,125

7 Claims. (Cl. 88—17)

This invention relates generally to motion picture projector apparatuses, and has particular reference to improvements in apparatuses for controlling the lighting of a battery of projectors.

Objects of the invention are to provide shutter control mechanism which is assembled in units which may be easily attached as units to projectors; to provide a construction having a minimum of electrical connections between units when the units are attached one to each of a battery of projectors; to provide a shutter operating mechanism which is simpler in construction and operation than prior devices of the kind; to provide a shutter control mechanism which is reliable in operation; to provide a shutter control mechanism which has a minimum of hand or foot operated devices for effecting the control; and, in general, to provide a shutter control apparatus which, in addition to the foregoing, has other objects and advantages which will become apparent later on.

One combination and relation of parts whereby the advantages are realized is hereinafter described with reference to the drawings accompanying and forming a part of this specification, those drawings being, however, illustrative only of one embodiment of the invention, the novel features of the invention being pointed out in the claims appended to the specification.

In said drawings:

Fig. 1 shows, in side elevation, one of the unitary assemblies adapted to be attached to the wall of a projector, a part of the casing of the unit being omitted to expose the interior mechanism to view.

Fig. 2 is a section, substantially along the line 2—2 of Fig. 1, looking in the direction of the arrows.

Fig. 3 is a top view of a section along the line 3—3 of Fig. 1, looking downward as indicated by the arrows.

Fig. 4 is a section on the line 4—4 of Fig. 2, but with the parts shown on a larger scale than in Fig. 2, and in the positions they occupy when the associated shutter has been raised.

Fig. 5 is a wiring diagram illustrating the simple electrical connections between a battery of these projectors.

The embodiment illustrated in the drawings contemplates attaching to the rear wall of each motion picture projector a unit such as is illustrated in Figs. 1 to 4 inclusive and connecting the units by a simple three wire system such as is illustrated in Fig. 5 of the drawings. The units are identical in construction and whatever is said hereinafter about the construction and operation of one of them applies to all of them.

The operating mechanism of each unit is enclosed in a box 10, with a manually operable handle 11 projecting through a slot in the top of the box and a shutter operating lever 12 projecting through a slot in one end of the box. Attached to the other end of the box is a mounting element or housing 20 adapted to hold the upper end of an armored and insulated cable (not shown) containing two wires 13, 14 (Fig. 5) connected respectively to circuit contacts 15 and 16 (see also Figs. 1 and 5) and a wire 17 forming parts of a circuit for energizing an associated solenoid coil 18. As will be clear later on, when the contacts 15 and 16 are closed and opened in any unit the solenoids of all of the units are energized and deenergized.

This box 10 is mounted on the rear wall 19 (Fig. 3) of a projector in a way which permits quick attachment and removal, but which nevertheless permits accurate location with reference to the light receiving opening 21 (Fig. 1) in the rear wall of the projector. For this purpose the rear wall 19 of the projector is provided with two or more studs 23 which are threaded into the wall of the projector and each provided with a collar 24 and a portion 25 slotted for a screw driver. The rear wall of the box 10 is provided with openings or holes to engage the stud portions 25. One or more of these holes may be elongated slightly as shown at 26 (Fig. 1) so as to permit of limited adjustment on the studs or to make it unnecessary to be extremely exact in the relative location of the studs 23 or of the holes in the metal box.

Attached to the inner wall of the box 10 is a member 27 (Figs. 1, 2 and 3) which constitutes a mounting for some of the mechanism and which is, in addition, provided with a vertical threaded hole for a locking screw 28. The member 27 also is provided with a hole in line with one of the holes in the wall of the box 10 for reception of one of the studs 23.

In attaching the unit to the wall 19 of the projector the studs 23 may be turned in or out to align the collars 24 and the holes in the box 10 then engaged over the portions 25 of the studs 23 and after the proper alignment is obtained the unit is secured in position by turning the locking screw 28 down into firm engagement with the stud 25. The advantages of this construction in the way of simplicity, adjustability and convenience are obvious, particularly when the fact that projector walls are often warped or otherwise irregular is taken into consideration.

The shutter employed is in the form of a blade or sheet 31 of any desired material having an arm or extension 32 pivoted at 33 to the lever 12 previously mentioned. The shutter 31 is preferably movably mounted in and guided by a unit 34 of any suitable construction attached by means of screws 35 to the wall of the projector and arranged to provide a vertical guide slot 36 for the shutter; and a light opening in line with and preferably a little smaller than the opening (not shown) through which the light is admitted into the projector.

From all of the foregoing it is apparent that attaching a set of the shutter controls to a battery of projectors is a simple matter. It is also apparent that the set can quickly be disconnected from any projector which has to be replaced or repaired by first loosening the locking screw 28 and disengaging the shutter 31 from its guide, or, if desired, also removing the guide, and that this can be done without disconnecting the wiring between the shutter control units.

As previously made clear, there is a shutter 31 and an operating unit therefor on each motion film projector. In each there is a spring, marked 30 in the drawings, which is first tensioned against the restraint of a latch and the latch is then tripped to release the spring and permit it to act through suitable connections to swing the lever 12 upward into the position in which it is shown in dotted outline in Fig. 1, thereby raising the shutter 31 to a position where it will no longer intercept passage of the light beam through the opening 21 into the projector. The spring is tensioned and the latch tripped by swinging the handle 11 from the position in which it is shown in Fig. 1 to the position indicated by the dotted outline. In addition, this single movement of manually operable lever 11 will permit any shutter previously raised at another projector to be lowered to cut off the light.

As best shown in Figs. 1 and 4, the handle 11 is secured by rivets 37 between the side arms 38 of a peculiarly shaped yoke having hubs 39 loose on a shaft 40 which has a reduced portion journalled in the member 27 and is, at its other or enlarged end, journalled in a bracket 41 supported from an inner wall of the box 10. The cross bar connecting the side arms of the yoke is shown at 42 (Fig. 4).

The spring 30 also is somewhat in the form of a yoke, it having a cross portion 43 normally engaging notches in the side arms 38 of the yoke 42, and side portions including coils around the yoke hubs 39 and portions 44 turned inward and then upward so as to engage under the side arms of the yoke.

The cross portion 43 of the spring 30 cooperates with a pin 45 set in the enlarged portion of the shaft 40. Secured on the shaft 40, as by means of a compression collar 46, is a segmental plate 47 provided with latch shoulders 48 and 49 and a shoulder 50 cooperating with a stud 51 on the side of the shutter operating lever 12. The latch shoulders 48 and 49 cooperate with a short rod or roller 52 supported between ears 53 on a latching member 54 which is pivoted at 55 between lugs on a bracket 56 attached to the inner bottom of the box 10. The latching member 54 is notched or slotted to engage a head 57 on the armature of a single coil solenoid 58, (see also 13 in Fig. 5) the solenoid being supported in a bracket 59 secured by screws 60 to the inner face of the box 10. A spring 61 has one end hooked in the slot or bifurcation in the latching member 54 and, after passing around the pivot 55, engages at its other end under the solenoid supporting bracket 59. This spring 61 tends at all times to hold the latching member 54 in the position in which it is shown in Figs. 1, 2 and 4.

When the shutter 31 is in its lowered or light intercepting position (shown in Fig. 1) the handle 11 will be in a vertical position and the rod 52 on the latching member 54 will be in engagement with the latch shoulder 49 on the member 47, and if the handle 11 is then swung and pressed to the position indicated by the dotted outline in Fig. 1 the shaft 40 and pin 45 will be held stationary. As a result, the cross portion 43 of the spring 30 will be held by the pin 45 while the coils and other parts of the spring are being tensioned by movement of the handle 11, because of the engagement of the hooked portions or ends 44 of the spring under the side arms 38 of the yoke 42. Near the end of the spring tensioning movement of the handle 11, when the switch 15, 16, 71 is closed and the solenoid 58 energized, the rod 52 on the latching member will be disengaged from the latch shoulder 49, whereupon the spring 30 will act through the pin 45 to turn the shaft 40 and plate 47 to the position shown in Fig. 4, thereby, through engagement of the shoulder 50 with the stud 51, swinging the lever 12 upward to raise the depending shutter 31 and admit light to the projector. The shutter is then latched in raised position as hereinafter explained.

The latching member is actuated to disengage 52 and 49 and release the spring 30 by energizing the solenoid 58 and thereby causing the head on the core to rock the latching member 54. The energizing circuit through the solenoid coil is established shortly before the handle 11 reaches the position indicated by the dotted lines in Fig. 1 by establishing an electrical connection between the contacts 15 and 16. The apparatus for doing this comprises a rectangular rod or bar 63 sliding in brackets 64 on the under side of the top plate of the box 10. A spring 65 around the rod cooperates with one of the brackets 64 and a pin 66 on the rod to hold the rod normally in the position shown in Fig. 1. One end of the rod is bent down as at 67 to form a shoulder which is engaged by a stud 68 (which may be a part of one of the rivets 37) on the side of the handle 11. The other end of the rod carries a block 70 of insulating material to which is attached a contact piece 71 long enough to bridge the gap between the contacts 15 and 16, both of which are mounted on a block 72 of insulating material. This causes the circuit to be closed as the spring tensioning movement of the handle 11 is completed, thereby causing the spring 30 to effect the shutter opening and the latch 54 to latch the shutter in elevated position by engagement of the rod 52 of the latching member 54 with the shoulder 48 of the segmental plate 47 when the handle 11 is released. The return spring 65 acts to break the circuit when manual pressure on the handle 11 is removed.

When a shutter 31 has been raised and latched in raised position, it normally remains in that position until the handle 11 of another unit is operated to tension the associated spring 30 and release it to effect a shutter operation, whereupon the solenoid 58 for the previously raised shutter will be energized again to disengage the latching device from the shoulder 48 on the segmental latching plate 47 and allow the shutter 31 to drop and intercept the light beam. This drop may be effected by gravity, but it is preferred to employ a spring 73 connected to an arm or extension of the lever 12 and a pin 74 on the member 27. This spring is inferior to the spring 30 and will be tensioned when the latter spring is released as above described, so that when the latching devices are released to free a shutter for closing the spring 73 will insure the lowering of the shutter to its light cut-off position.

When a shutter has been lowered the operator may raise it manually by lifting the lever 12 or the shutter arm 32 to see, for example, if the film is properly framed in the aperture, and the shutter will then return to closed position when it is released. Lifting the shutter in this manner, even though the segmental plate 47 is latched in the position shown in Fig. 1, is possible because of the nature of the connection afforded by the stud 51 on the lever 12 and the shoulder 50 on the segmental latching plate.

Owing to the three wire system employed for electrically connecting together a plurality of the shutter operating units, it is not necessary to operate the handles 11 in any particular sequence, as the operation of the handle of one unit to tension the associated shutter operating spring 30 will cause all of the solenoids 58 to be energized to actuate all of the latching elements 54. This will release the spring 30 and open the shutter associated with the handle 11 being operated, and will allow any or all of the other shutters to be closed by the springs 73 when the elements 48 and 52 of the latches are disengaged.

The electrical connections and circuits for three units are illustrated in Fig. 5. As there shown, the coils 18 of the solenoids 58 are permanently connected at 75 to the negative lead 76 of a circuit and at 77 (by means of a wire 14a) to the contact 16 and the wire 14, the latter wire being connected both to the contact 16 and to a third wire 78 connecting or common to all of the contacts 16 in the three units. The contact 15 in each unit is connected at 79 to the positive lead 80 of the circuit. When the contact piece 71 of any unit is caused to close the circuit through its contacts 15 and 16 as previously described, the current will flow from the positive wire 80 through contact 16 and from there both through the coil 18, the associated solenoid 58 to the negative lead 76 and through the wire 14 to the third wire 78. This has the effect of temporarily making the wire 78 a part of or extension of the positive lead 80 so that a complete circuit is established through all of the wires 14, 14a, the solenoids 58 and the wires 17 to the negative lead 76. Thus all of the solenoids are energized and their latching members 54 actuated to disengage all of the segmental latching plates 47 with results which have already been explained in detail.

From all of the foregoing it is apparent that by using the spring actuated mechanism for opening the shutters and single coil solenoids for controlling the latches 54 in opening and closing the shutters it has been possible to do away with double coil solenoids and complicated switches for energizing one or the other of the two coils according to the shutter movement desired, with consequent simplification of the wiring, while at the same time making the shutter control mechanism simpler in construction and certainty of operation and less likely to get out of order in use. The operation of the apparatus also is greatly simplified, as all that is necessary to open one shutter and close another is a single manual movement of the handle 11 of the unit for the shutter which is to be opened.

While the apparatus shown in the drawings and described above is admirably adapted to fulfill the purposes stated, that apparatus is only illustrative of one satisfactory embodiment of the invention, and it is not the desire to be limited by the showing and description except to such an extent as indicated by the claims which follow.

What is claimed is:

1. A plurality of motion picture projectors each having a light receiving opening and means for projecting light through said openings, a shutter for each of said openings, a manipulative device associated with each shutter, a solenoid associated with each manipulative device and energized by movement of said device, a normally untensioned spring associated with each manipulative device, means controlled jointly by each manipulative device and the solenoid associated therewith for first tensioning the associated spring by movement of said manipulative device and then releasing the spring when the solenoid is energized, connections driven by the spring when released for moving the associated shutter to admit light through the opening in the projector, means for retaining the shutter in light admitting position, and means for disabling said retaining means by operating the manipulative device associated with another shutter.

2. A light cut-off device for a motion picture projector comprising a shutter, a member movable to raise and lower the shutter to admit or cut off the light beam of the projector, means comprising a normally untensioned spring for actuating said member to raise the shutter, a manually operable member for tensioning the spring, a latch for restraining the spring while it is being tensioned, a solenoid connected to and operable to release the latch and thereby render the spring effective to operate the shutter lever to raise the shutter, and a circuit closed by movement of the manually operable member for energizing the solenoid and thereby operating the latch to release the shutter operating spring and raise the shutter.

3. A light cut-off device for a motion picture projector comprising a shutter, a member movable to raise and lower the shutter relative to the projector light beam to admit or cut off light to the projector, means comprising a normally untensioned spring for actuating said member to raise the shutter, a manually operable member for tensioning the spring, a latching device for restraining the spring until it is tensioned and for holding the shutter in raised position, a solenoid connected to the latching device, a circuit for the solenoid controlled by the manually movable member for energizing and deenergizing the solenoid to operate the latching device to release the tensioned spring to operate the shutter lever, and means for operating the latching device to latch the shutter in lifted position when the solenoid is deenergized.

4. In an apparatus of the character described, a plurality of motion picture projectors and a source of light for each projector, a shutter for each projector movable to cut off or admit light to its projector as desired, a manually operable device associated with each shutter, said devices being independently and selectively operable, a solenoid for each shutter, a latching device for each shutter operatively connected to the corresponding solenoid, a spring associated with each latching device and tensioned against the restraint of its latching device by movement of the corresponding manually operable device, a circuit closed through all of the solenoids by a spring tensioning movement of any one of the manually operable devices to release all of the latches, means actuated by the tensioned spring when released by its latch for moving the associated shutter to admit light to its projector, and means released by the other latches for moving to light cut-off positions the shutters associated with the other projectors.

5. In an apparatus of the character described, a plurality of motion picture projectors each having a source of light and a shutter between each source and each projector for cutting off or admitting light to its projector as desired, a manually operable device associated with each shutter, said devices being selectively operable, a solenoid for each shutter, a latching device for each shutter operatively connected to the solenoid for its shutter, a spring associated with each latching device and tensioned against the restraint of its latch by movement of the corresponding manually operable device, and a circuit closed through all of the solenoids by a spring tensioning movement of any of the manually operable devices to release all of the latches, means actuated by the one of said springs which has been tensioned for moving the associated shutter to admit light to its projector when the associated latch is released by its solenoid, and means released, when the other solenoids are energized and their latches operated, for moving any other shutter from a light admitting to a light cut off position.

6. An apparatus of the character described comprising a source of light and a projector having a housing provided with an opening for the passage of light from said source, a shutter movable to cut off or admit the light through said opening as desired, a manually operable device, shutter control mechanism comprising a latch for holding the shutter in light cut-off position relative to the light receiving opening in the projector housing and a spring between the latch and the manually operable device tensioned by movement of the manually operable device, a solenoid connected to operate the latch when the solenoid is energized, and circuit closing devices operated by the spring tensioning movement of the manually operable device to establish an energizing circuit through the solenoid to release the latch after the spring is tensioned and thereby release the spring, and connections actuated by the released spring for moving the shutter to clear the light receiving opening in the housing.

7. A change-over system for a battery of motion picture projectors, comprising a shutter for each projector, a movable support for each shutter operable to move the shutter into and out of its light intercepting position, a latching device for each shutter for holding its shutter support against movement when the shutter is in either its light intercepting or its non-intercepting position, a manually operable device for each shutter, means controlled by the manually operable devices and rendered effective by operation of any one of said devices for releasing all of the aforesaid latches, and springs released by the releasing of the latches and connected to move the shutter supports.

CHARLES S. THIDE.